US009428368B2

(12) United States Patent
Trojer et al.

(10) Patent No.: US 9,428,368 B2
(45) Date of Patent: Aug. 30, 2016

(54) DEVICE FOR DRIVING A HANDRAIL FOR AN ESCALATOR OR MOVING WALKWAY

(71) Applicant: Inventio AG, Hergiswil (CH)

(72) Inventors: Andreas Trojer, Vienna (AT); Georg Adamcik, Baden (AT); Michael Matheisl, Vösendorf (AT); Thomas Novacek, Schwechat (AT)

(73) Assignee: INVENTio AG, Hergiswil (CH)

( * ) Notice: Subject to any disclaimer, the term of this patent is extended or adjusted under 35 U.S.C. 154(b) by 0 days.

(21) Appl. No.: 14/652,470

(22) PCT Filed: Dec. 6, 2013

(86) PCT No.: PCT/EP2013/075825
§ 371 (c)(1),
(2) Date: Jun. 16, 2015

(87) PCT Pub. No.: WO2014/095429
PCT Pub. Date: Jun. 26, 2014

(65) Prior Publication Data

US 2015/0298942 A1 Oct. 22, 2015

(30) Foreign Application Priority Data

Dec. 17, 2012 (EP) .................................... 12197472

(51) Int. Cl.
*B65G 23/02* (2006.01)
*B66B 23/04* (2006.01)
*B66B 19/00* (2006.01)

(52) U.S. Cl.
CPC .............. *B66B 23/04* (2013.01); *B66B 19/007* (2013.01)

(58) Field of Classification Search
CPC ....... B66B 23/02; B66B 23/04; B66B 23/06; B66B 23/24
USPC .................................................. 198/330, 337
See application file for complete search history.

(56) References Cited

U.S. PATENT DOCUMENTS 3,049,213 A * 8/1962 Fabula .................... B66B 23/04 198/331
5,125,494 A * 6/1992 Nurnberg ................ B66B 23/04 198/330

(Continued)

*Primary Examiner* — James R Bidwell
(74) *Attorney, Agent, or Firm* — Ladas & Parry LLP

(57) ABSTRACT

The invention relates to a device (2) for driving a handrail (6) for an escalator (40) or for driving a handrail (6) for a moving walkway, the device comprising a drive belt (1) guided along a contact zone (10) and deflected on a deflection roller (7) after passing through the contact zone (10). The handrail (6) can be guided resting against the drive belt (1) along the entire contact zone (10) and can be driven by the drive belt (1) by means of friction between drive belt (1) and handrail (6). The device (2) comprises a deflection element (16), which deflection element (16) ensures that a lift-off point (18) of the handrail (6) from the drive belt (1) delimiting the contact zone (10) is arranged upstream of the deflection region of the drive belt (1) on the deflection roller (7). According to the invention, an escalator (40) or a moving walkway can be modernized with such a device (2).

10 Claims, 4 Drawing Sheets

(56) References Cited

U.S. PATENT DOCUMENTS

| | | | | | |
|---|---|---|---|---|---|
| 5,295,567 | A | | 3/1994 | Zaharia | |
| 5,427,221 | A | * | 6/1995 | Spriggs | B66B 23/04 198/335 |
| 5,544,730 | A | | 8/1996 | Adrian | |
| 5,638,937 | A | * | 6/1997 | Birney | B66B 23/04 198/335 |
| 5,782,333 | A | * | 7/1998 | Pitts | B66B 23/20 198/336 |
| 6,460,679 | B1 | * | 10/2002 | Stuffel | B66B 23/20 198/336 |
| 7,770,710 | B2 | * | 8/2010 | Stuffel | B66B 23/20 198/330 |
| 7,954,619 | B2 | * | 6/2011 | Nurnberg | B66B 23/04 198/322 |
| 7,954,620 | B2 | * | 6/2011 | Winkelhake | A61K 31/4985 198/330 |
| 2007/0045082 | A1 | * | 3/2007 | Ishikawa | B66B 23/04 198/330 |

* cited by examiner

DEVICE FOR DRIVING A HANDRAIL FOR AN ESCALATOR OR MOVING WALKWAY

The invention relates to a device for driving a handrail. The handrail can be a component of an escalator or a moving walkway. The invention equally relates to an escalator or a moving walkway with such a device.

BACKGROUND OF THE INVENTION

Escalators or moving walkways comprise a circulating step belt for the transport of persons or objects, and a support structure. The step belt is bounded along its conveying direction on each side by a respective balustrade, which balustrade is arranged on a balustrade base. A handrail guided to circulate is arranged at such a balustrade along its upper terminal. The return guide of the handrail is usually integrated in the balustrade base or alternatively can be arranged in the support structure of the escalator or the moving walkway. A handrail drive driving the handrail is usually arranged at the return guide of the handrail.

U.S. Pat. No. 5,295,567 shows such a handrail drive of an escalator, wherein the handrail drive is arranged in a support structure of the escalator. The handrail drive comprises a drive belt guided by way of two deflecting rollers to circulate. A handrail to be driven by the handrail drive is guided at this drive belt by means of a counter-pressure roller. The handrail is moved or driven by way of a friction couple, which results therefrom, between the drive belt and the handrail. The escalator additionally comprises a deflecting curve, which is fastened to the support structure of the escalator and which is needed, due to the high dimensions of the support structure, for further guidance of the handrail.

However, in the illustrated solution there is the disadvantage that the escalator due to the high dimension of the support structure imposes a need for increased space in its installed state.

In the case of a support structure with smaller dimensions the handrail can be deflected in the immediate vicinity of the handrail drive. Such deflecting means are shown in, for example, JP-B-54-34235 and U.S. Pat. No. 3,414,109. The deflection roller, by way of which the drive belt is guided, could accordingly be equally well used as deflection roller for the handrail. This means that the handrail bearing against the drive belt executes a directional change which is considered necessary with respect to the increased demands on space conditions. In the case of detaching of the handrail from the drive belt in the course of such a joint deflection of the handrail together with the drive belt, however, a disturbing effect arises which increases wear not only of the drive belt, but also of the handrail. In addition, this effect causes unpleasant, disturbing noise.

BRIEF SUMMARY OF THE INVENTION

It is therefore the object of the invention to provide a device for driving a handrail for an escalator or a moving walkway, which device enables reduced wear of the handrail and the drive belt.

The object is fulfilled by a device for driving a handrail of an escalator or for driving a handrail of a moving walkway, the device comprising: a drive belt, which is deflected by way of a first and a second deflection roller and forms a contact zone, and at least one counter-pressure guide roller, which has the effect that the handrail can be guided along the entire contact zone while bearing against the drive belt and is drivable by the drive belt by means of friction couple between drive belt and handrail, wherein the device comprises a first tangential plane, which is tangential to the deflection rollers and which is formed parallel to the axis of rotation of the deflection rollers, and a second tangential plane, which is tangential to the at least one counter-pressure guide roller or one of the deflection rollers, wherein the second tangential plane is arranged parallel to the first tangential plane and the first and second tangential planes are so constructed that the deflection rollers and the at least one counter-pressure guide roller are arranged between the tangential planes, characterised in that the device comprises a deflecting element, which is arranged between the first and second tangential planes and at a spacing from the deflection roller and which ensures that a lift-off point, which bounds the contact zone, of the handrail from the drive belt is arranged at the deflection roller ahead of the region of deflection of the drive belt.

The object is equally fulfilled by modernisation of an escalator or moving walkway with such a device.

It has been recognised that the effect causing the unpleasant noise arises because not only the drive belt, but also the handrail are elastic. Consequently, changes in length of the outer surfaces of the drive belt and the handrail occur, in particular, when the handrail is separated from the drive belt in the region of a common bending or deflection. These changes in length are more pronounced the stronger the common deflection, which is executed under friction couple or adhesive couple, directly before the separation or detaching thereof.

At the point of separation, i.e. the lift-off point, stresses caused by the changes in length thus arise between the two directly adjacent outer surfaces of the drive belt and the handrail. These stresses are relieved by repeated dissolution of the frictional couple connection between the handrail and the drive belt in the immediate vicinity of the lift-off point. Rubbing of the handrail against the drive belt and accordingly the mentioned disturbing effect result therefrom.

Consequently, the deflection roller provided for the drive belt cannot be additionally employed for deflection of the handrail, although such a use of the deflection roller would make possible a very small need for space for the components for operation of the handrail and an additional propulsion for the handrail due to the increased contact area. This means that in the case of limited availability of space for installation of the device provided for drive of the handrail it would be obvious to dispense with as many components as possible for guidance of the handrail.

In order to not only prevent the effect causing the wear, but also to achieve a space saving by a deflection of simple design, the device for driving the handrail has to include an additional deflecting element. The deflecting element enables on the one hand space-saving guidance of the handrail as a consequence of its arrangement between the tangential planes formed by the device, although the deflecting element itself demands additional space, and on the other hand the correspondingly placed deflecting element enables gentle detaching of the handrail from the drive belt.

BRIEF DESCRIPTION OF THE FIGURES

In a development of the device the deflecting element is formed by a deflection roller. In that way, low-friction guidance of the handrail by way of such a deflecting element is made possible, which allows correspondingly smaller dimensioning of other components of the device.

A development of the device comprises a second deflection roller, wherein one of the deflection rollers is arranged to be adjustable in order to tension the drive belt and press it against the handrail. By means of adjustment or adjustability of one of the deflection rollers the drive belt can tighten and press against the contacting handrail. In that way, slip between the handrail and the drive belt in the region of the contact zone can be prevented, which slip can lead to a less effective drive of the handrail. It is thus possible by means of such an adjustability to dispense with devices which require additional space and which prevent such slip.

DETAILED DESCRIPTION OF THE INVENTION

A development of the device comprises a counter-pressure guide roller which has the effect that the handrail can be guided, bearing against the drive belt, in the contact zone and is drivable or movable by the drive belt by means of friction couple between drive belt and handrail. It is possible by means of this counter-pressure guide roller to press the handrail against the drive belt, whereby a drive movement of the drive belt is transmissible to the handrail. The friction couple can in that way be maintained between drive belt and handrail along the contact zone. Beyond that, the device can comprise two counter-pressure guide rollers, wherein the at least two counter-pressure guide rollers form a roller curve. Such a roller curve comprising a plurality of counter-pressure guide rollers has the advantage of being able to press the handrail against the drive belt over a relatively lengthy contact zone without individual ones of the counter-pressure rollers having to have for the same purpose a diameter demanding a much greater space.

In a development of the device the deflection roller is constructed as a cogged belt pulley and the drive belt is constructed as a cogged belt. It is possible to prevent, by means of such an embodiment, slip from arising between the drive belt and deflection roller. Alternatively thereto the drive belt can be a wedge belt, preferably a poly-V-belt, and the deflection roller can form or have a guide surface corresponding with the wedge belt. In that way it is possible to dispense with special devices which for their part prevent the drive belt from slipping from the deflection roller.

In a development of the device the drive belt is provided to bear against a handgrip surface of the handrail within the contact zone. This handgrip surface and the drive belt are usually materials which can form a particularly good friction couple within the contact zone.

Figure 1:
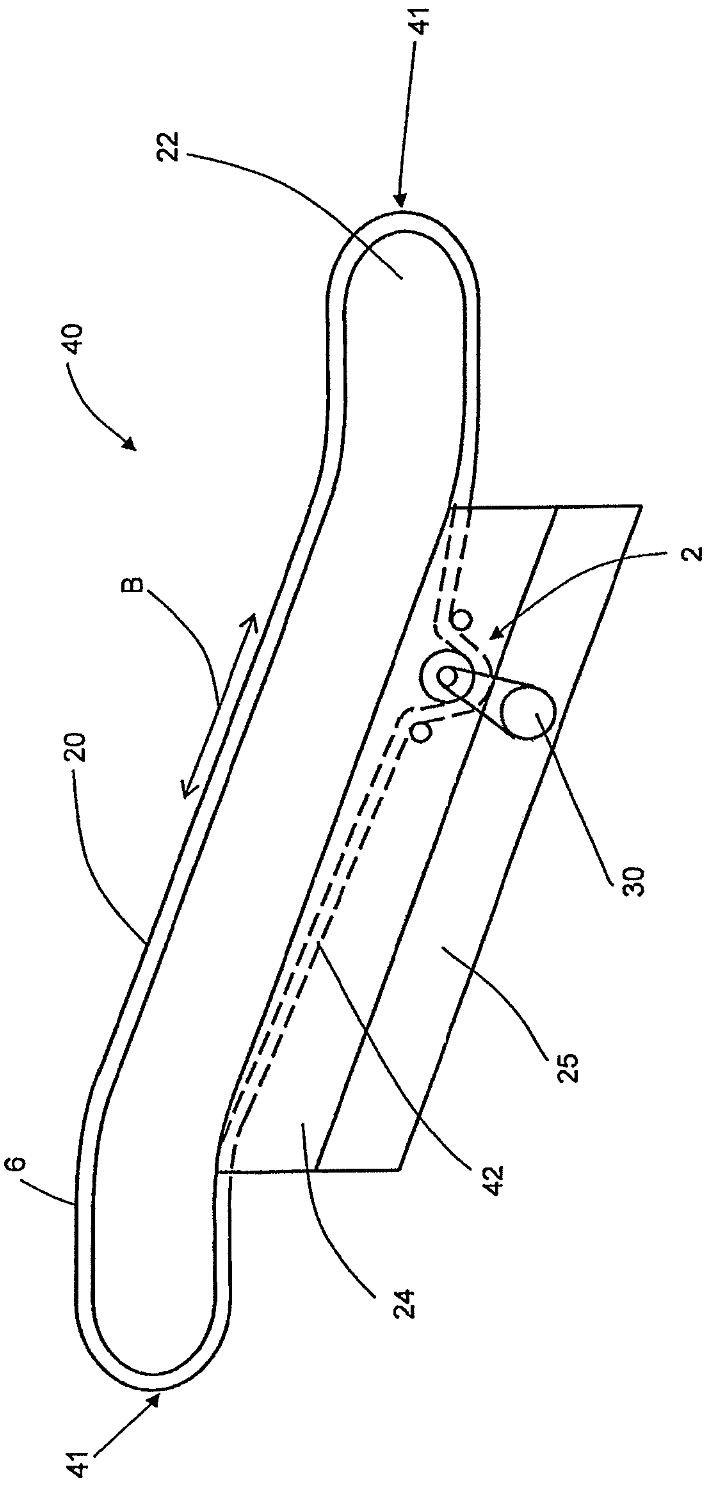
Figure 2:
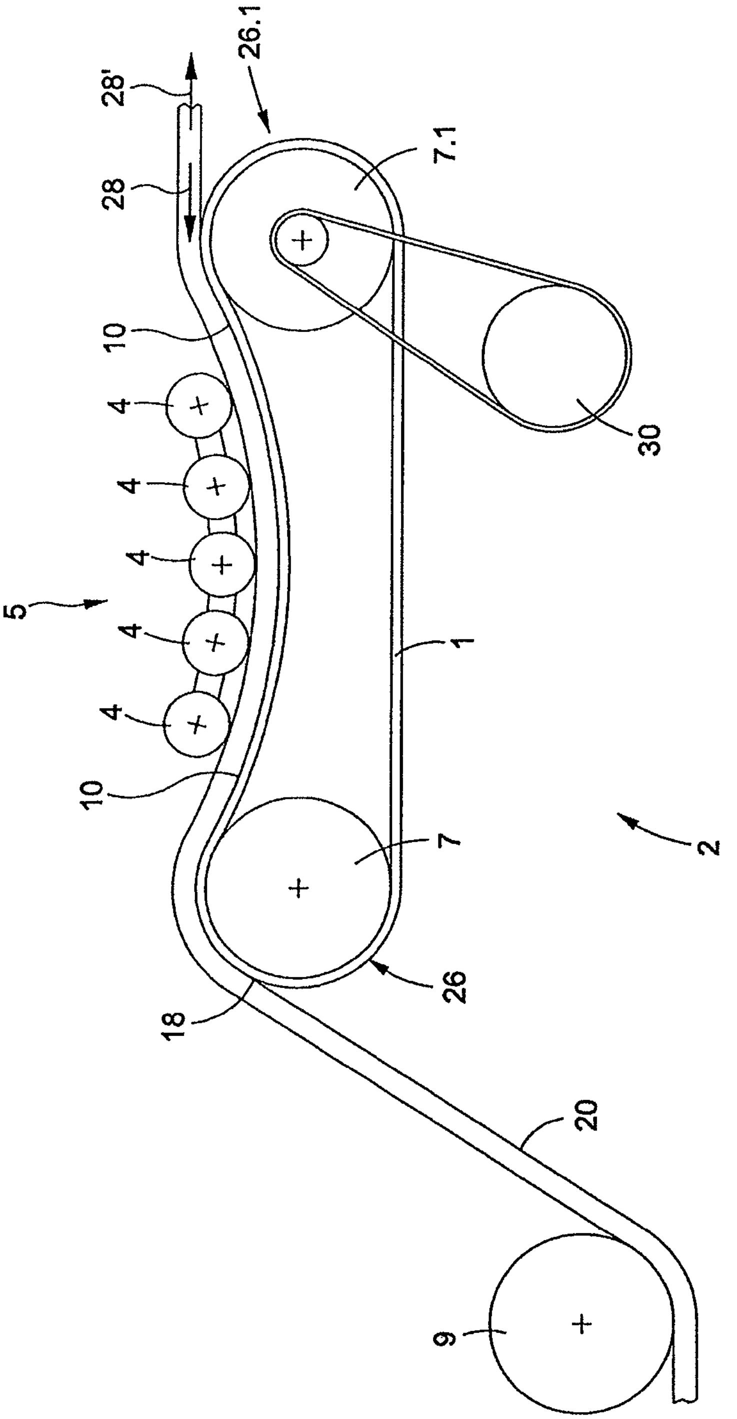
Figure 3:
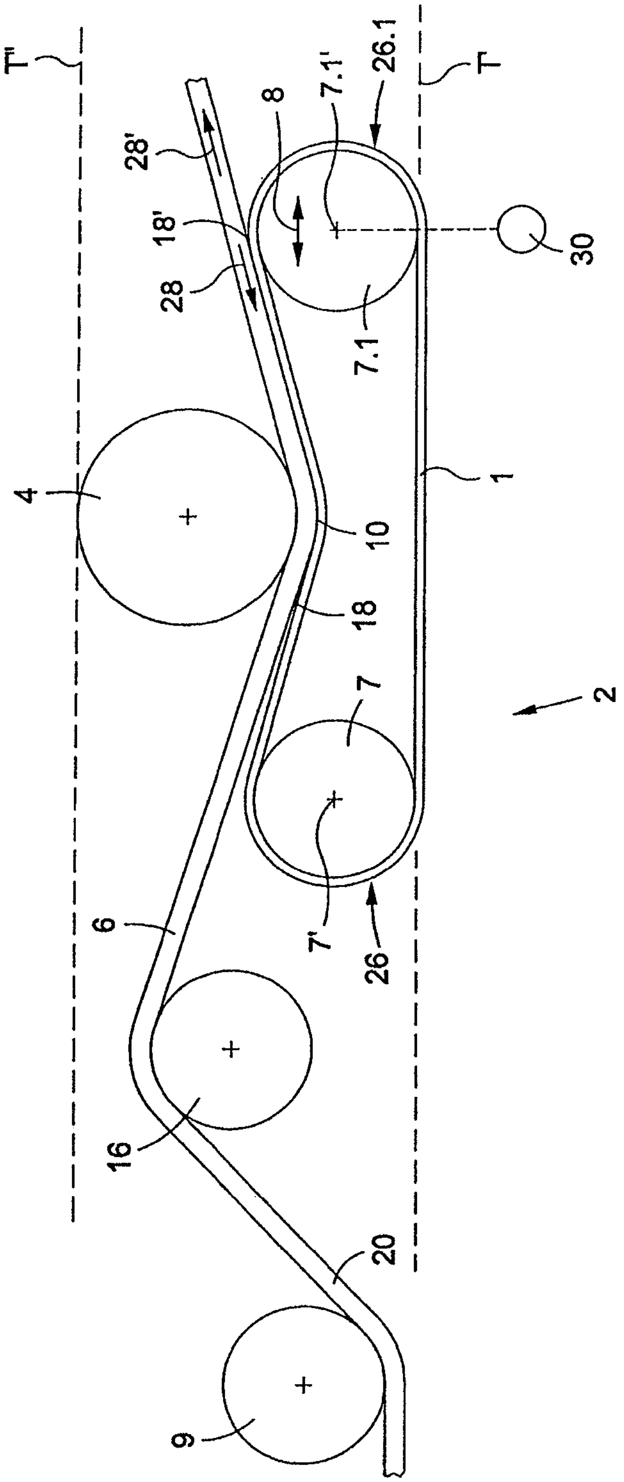
Figure 5:
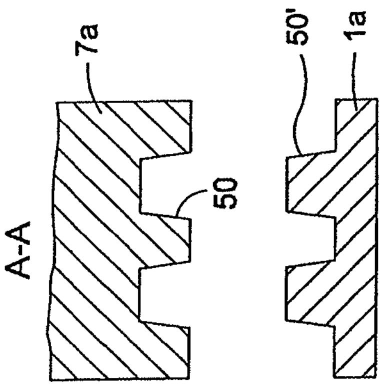
Figure 6:
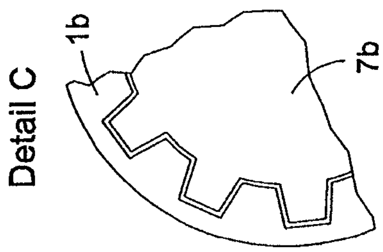
Figure 4:
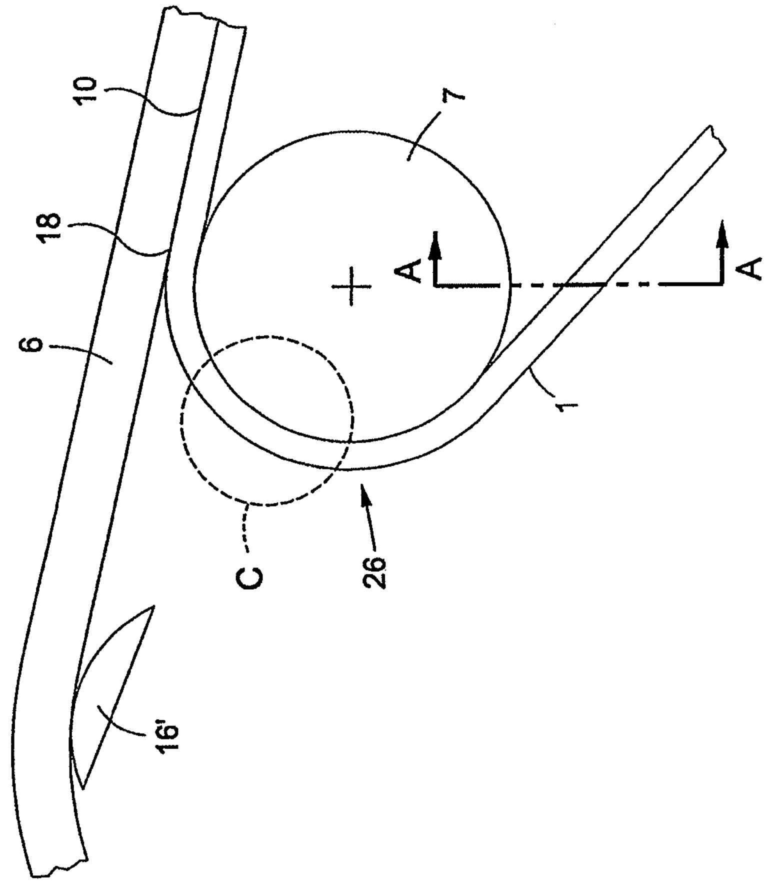

The invention is explained in more detail in the following by way of figures, in which:

FIG. 1 shows an escalator with a handrail;

FIG. 2 shows a device, which is provided for driving the handrail, with a guide roller;

FIG. 3 shows a device for driving the handrail, with a deflecting element according to a first variant of embodiment;

FIG. 4 shows a device for driving the handrail, with a deflecting element according to a second variant of embodiment;

FIG. 5 shows a first form of embodiment a drive belt, which is guided by a deflection roller, of a device for driving the handrail; and FIG. 6 shows a second form of embodiment a drive belt, which is guided by a deflection roller, of a device for driving the handrail.

FIG. 1 shows an escalator 40. The escalator 40 comprises a support structure 25, a balustrade 22, a balustrade base 24 and a handrail 6. The handrail 6 is guided and moved to circulate. A visible part 41 of the handrail 6 can be guided along an outer edge of the balustrade 22. A return guide 42 of the handrail 6 usually runs within the balustrade base 24 and/or within the support structure 25, wherein the height, which is present in the installed state of the escalator 40, of the balustrade base 24 or the support structure 25 is limited. A device 2 for driving the handrail 6 can be arranged at the return guide 42 of the handrail 6. The device 2 is coupled with a drive motor 30. The drive motor 30 produces the circulating, preferably reversible movement B of the handrail 6. The components of the escalator 40 described in the description are equally usable as components of a moving walkway.

FIG. 2 shows a device 2 for driving a handrail 6. The device 2 comprises a first deflection roller 7, a second deflection roller 7.1 and a drive belt 1 guided to circulate. The device 2 has a contact zone 10. The drive belt 1 is guided not only by way of the deflecting rollers 7, 7.1, but also along the contact zone 10. The drive belt 1 is deflected at these deflection rollers 7, 7.1 in a respective deflection region 26, 26.1 associated with the deflection roller 7, 7.1.

In the installed state of the device 2 in the escalator the handrail 6 is guided or moved, bearing against the drive belt 1, along the entire contact zone 10. An exemplifying drive motor 30 is coupled with the drive belt 1 so that the drive belt 1 can be moved in circulation. Such a drive motor 30 can be constructed as an electric motor. The handrail 6 is drivable by means of a friction couple which is present within the contact zone 10 between the drive belt 1 and the handrail 6. The handrail 6 moved by means of the drive motor 30 can have a movement direction 28.

The contact zone 10 is limited by means of a lift-off point 18. This means that the handrail 6 in its movement direction 28 from the lift-off point 18 moves away from the drive belt 1. The lift-off point 18 shown in FIG. 2 is arranged within the deflecting region 26 of the drive belt 1, with which deflecting region 26 a first one of the deflection rollers 7 is associated. Such an arrangement of the lift-off point 18 can be caused by a guide roller 9 for guidance of the handrail 6. Such an arrangement of the lift-point 18 leads to the undesired effect described in the introduction that not only the wear or abrasion of the drive belt 1 and the handrail 6 is increased, but also unpleasant noises are caused.

The device 2 comprises at least one counter-pressure guide roller 4 in order to guide the handrail 6 along, the contact zone 10. At least two of these counter-pressure guide rollers 4 can form a roller curve 5.

FIG. 3 shows a second device 2 for driving the handrail 6 of the escalator. The device 2 shown in FIG. 3 comprises, additionally to the device 2 shown in FIG. 2, a deflecting element 16. The deflecting element 16 has the effect that the lift-off point 18 is not arranged within the deflecting region 26, which is associated with the first deflection roller 7, of the drive belt 1. In that way it is possible to avoid rubbing of the handrail 6 against the drive belt 1 in the immediate vicinity of the lift-off point 18. The deflecting element 16 can be constructed as, for example, deflection roller 16.

The device 2 forms a first tangential plane T' and a second tangential plane T". The first tangential plane T' is arranged parallel to the axes 7', 7.1' of rotation of the deflection rollers 7, 7.1 and tangential to the first deflection roller 7 and the second deflection roller 7.1. The second tangential plane T" is arranged parallel to the first tangential plane T' and tangential to the counter-pressure guide roller 4. The tangential planes T', T" are in that case so arranged that the first and second deflecting rollers 7, 7.1 and the at least one counter-pressure guide roller 4 are arranged between these tangential planes T', T". For this purpose, the second tangential plane T" can, in an arrangement of the rollers 4, 7, 7.1 differing from FIG. 3, be tangential to the first deflection roller 7 or the second deflection roller 7.1 instead of the counter-pressure guide roller 4. The arrangement of the rollers 4, 7, 7.1 between the tangential planes T', T" makes it possible for the device 2 for driving the handrail 20 to be integrated in the balustrade base or in the support structure of lower height.

One of the deflection rollers 7.1 can be arranged to be adjustable by means of an adjusting device 8, so that, for example, a re-adjustment of the device 2 during a service or assembly of the escalator is made possible. It can be ensured by means of this possibility for re-adjustment that the drive belt 1 is sufficiently tensioned and/or bears against the handrail 6 within the provided contact zone 10.

Moreover, the device 2 can be so constructed that the handrail 6 can be driven by means of the drive motor 30 not only in accordance with the movement direction 28, but also counter to this movement direction 28 in a counter-movement direction 28'. In the case of such a drive capability of the handrail 6 in opposite directions 28, 28' of movement a lift-off point 18' bounding the contact zone 10 can be so arranged by means of a deflecting element (not illustrated) that the contact zone 10 does not extend within the deflecting region 26.1 associated with a second one of the deflection rollers 7.1.

The directional change, which is illustrated in FIGS. 2 and 3, of the handrail 6 in the case of deflection thereof at the guide roller 9 or the deflecting element 16 can take place in less pronounced manner so as to, for example, expose the handrail 6 to lower loads. In order to further reduce these loads on the handrail 6 or to improve drivability of the handrail 6 by the drive belt 1 a handgrip surface 20 of the handrail 6 can be guided in the contact zone 10 to bear against the drive belt 1.

FIG. 4 shows a third device 2 for driving the handrail 6 of the escalator. The device 2 comprises a deflecting roller 7, a deflecting element constructed as a deflecting member 16', a drive belt 1 and a contact zone 10. The drive belt 1 is deflected at this deflection roller 7 in a deflecting region associated with the deflection roller 7. The handrail 6 is provided to be guided along the contact zone 10 while bearing against the drive belt 1. The deflecting member 16' has the effect that the handrail 6 does not bear against the drive belt 1 in the deflecting region 26 associated with the deflection roller 7. The deflecting element is preferably so formed or constructed that a low level of friction is present between this deflecting element and the moved handrail 6. Accordingly, the deflecting member 16' can be coated with, for example, low-friction PTFE material and/or with polyoxymethylene (POM) and/or polyamide (PA).

FIG. 5 shows a first form of embodiment of a drive belt, which is guided by a deflection roller, of a device for driving the handrail. FIG. 5 in that case shows a detail of the device 2, which is shown in FIG. 4, in a sectional illustration A-A. The drive belt shown in accordance with FIG. 4 is constructed as a wedge belt 1*a* and the deflection roller shown in accordance with FIG. 4 is correspondingly constructed as a belt pulley 7*a*, preferably as a poly-V-belt. This means that the deflection roller 7*a* forms a guide surface corresponding with the wedge belt 1*a*. Consequently, the belt pulley 7*a* has a grooved-pulley cross-section 50 and the wedge belt 1*a* has a grooved-wedge-belt cross-section 50'.

FIG. 6 shows a second form of embodiment, which is an alternative to FIG. 5, of a drive belt, which is guided by a deflection roller, of a device for driving the handrail. FIG. 6 in that case shows a detail C of the device 2 shown in FIG. 4. The drive belt shown in accordance with FIG. 4 is constructed as a cogged belt 1*b* and the deflection roller shown in accordance with FIG. 4 correspondingly constructed as a cogged belt pulley 7*b*, which means that the cogged belt pulley 7*b* forms a guide surface corresponding with the cogged belt 1*b*.

The invention claimed is:

1. Device (2) for driving a handrail (6) of an escalator (40) or for driving a handrail (6) of a moving walkway, the device (2) comprising: a drive belt (1), which is deflected by way of a first and a second deflection roller (7, 7.1) and forms a contact zone with the handrail (10), and at least one counter-pressure guide roller (4), for guiding the handrail (6) along the entire contact zone (10) bearing against the drive belt (1) and which is drivable by the drive belt (1) by means of friction couple between the drive belt (1) and handrail (6), wherein the device (2) further comprises a first tangential plane (T'), which is tangential to the first and second deflection rollers (7, 7.1) and which is formed parallel to the axis of rotation of the first and second deflection rollers (7, 7.1), and a second tangential plane (T"), which is tangential to the at least one counter-pressure guide roller (4) or one of the first and second deflection rollers (7, 7.1), wherein the second tangential plane (T") is arranged parallel to the first tangential plane (T') and the first and second tangential planes (T', T") are so constructed that the first and second deflection rollers (7, 7.1) and the at least one counter-pressure guide roller (4) are arranged between the tangential planes (T', T"), characterized in that the device (2) comprises a deflecting element (16), which is arranged between the first and second tangential planes (T', T") and at a spacing from the first and second deflection rollers (7, 7.1) and which ensures that a lift-off point (18), which bounds the contact zone (10), of the handrail (6) from the drive belt (1) is located at the deflection roller (7) ahead of a region of deflection of the drive belt by the counter-pressure guide roller (1).

2. Device (2) according to claim 1, wherein the deflecting element (16) is formed by a deflection roller (16).

3. Device (2) according to claim 1, wherein one of the deflection rollers (7.1) is arranged to be adjustable so as to tighten the drive belt (1) and press it against the handrail (6).

4. Device (2) according to claim 1, with at least two counter-pressure guide rollers (4), wherein the at least two counter-pressure guide rollers (4) form a roller curve (5).

5. Device (2) according to claim 1, wherein the deflection rollers are constructed as cogged belt pulleys (7*b*) and the drive belt is constructed as a cogged belt (1*b*).

6. Device (2) according to claim 1, wherein the drive belt is a wedge belt (1*a*) and the deflection roller (7*a*) forms a guide surface corresponding with the wedge belt (1*a*).

7. Device (2) according to claim 1, wherein the drive belt (1) is provided to bear against a handgrip surface (20) of the handrail (6) within the contact zone (10).

8. Escalator or moving walkway with a device (2) for driving a handrail (6) of the escalator according to claim 1.

9. A method for modernization of an escalator (40) or a moving walkway comprising the step of retrofitting on the escalator or moving walkway a device (2) according to claim 1.

10. The device of claim 6 wherein the wedge belt is a poly-V-belt.

* * * * *